Feb. 16, 1965

M. RENOULT 3,169,396

AUTOMATIC DEVICE TO ESTABLISH QUICKLY GAGING CHARTS
FOR LIQUID HOLDING VESSELS

Filed March 27, 1961

INVENTOR
Marius Renoult
By *[signature]*
ATTORNEYS

United States Patent Office 3,169,396
Patented Feb. 16, 1965

3,169,396
AUTOMATIC DEVICE TO ESTABLISH QUICKLY GAGING CHARTS FOR LIQUID HOLDING VESSELS
Marius Renoult, Epinay sur Seine, France, assignor to Societe Desauge & Lair, Alfortville, France, a corporation of France
Filed Mar. 27, 1961, Ser. No. 98,660
Claims priority, application France, Mar. 29, 1960, 822,786
4 Claims. (Cl. 73—198)

Vessels or containers for holding liquids, in particular those adapted for transportation, such as tank trucks or tank wagons, have always an individual gaging chart by which a correspondence may be effected between the numbers of cubic feet of the liquid held in this container and the dimension figure in inches of the liquid surface as measured either from the bottom or more generally from the plane of the upper orifice of the container.

Establishment of such charts is generally made in a rule-of-thumb fashion by introducing known quantities of liquid into the container and by measuring with a gage the corresponding dimension figures; a curve is then plotted by which it is possible to ascertain inch by inch the corresponding volume of the liquids and to establish the depth/volume chart. It is also feasible to establish in the same manner the flow chart showing the dimension figures in inches corresponding to round values of the volume. Carrying out of such a process is time consuming and comprises many error sources.

The present invention aims precisely to reduce such operating time and the number of handlings, by obtaining in a single operation a record which can be used for ascertaining the figures to be inscribed on the chart.

One object of my invention is to provide a new process for establishing the gaging chart for a container, essentially characterized by the fact that said container is emptied, the same having previously been completely filled (or the fact that said initially empty container is filled) through a flow meter, said flow meter rotating a first shaft in proportion to the liquid flowed past, after having disposed in the container a level gage driving into rotation a second shaft in proportion to the level change, and that a record is made on a tape by servoing in a continuous manner the unwinding of said tape to the rotation of one of said shafts, and by servoing in a discontinuous manner the recording member to the rotation of the other of said shafts.

Another object of this invention is to provide a device for establishing gaging charts according to the aforementioned process, essentially characterized by the fact that it comprises in combination a flow meter adapted to be connected to the drain orifice of the container to be gaged and comprising a first shaft driven into rotation proportionally to the liquid flowed past, a level gage constituted by a pressure responsive member provided with stress gages which are inserted into a Wheatstone bridge connected in an opposed relationship with a second comparison Wheatstone bridge which is provided with a balancing potentiometer driven by a motor servoed to the current resulting from said both Wheatstone bridges, said motor rotating also a second shaft proportionally to the level change in the container, and a tape recorder in which unwinding of the tape is servoed in a continuous manner to the rotation of one of the abovementioned shafts and the recording member of which is servoed in a discontinuous manner to the rotation of the other of said shafts.

In particular, for making depth/volume charts which are the most used, unwinding of the tape is servoed in a continuous fashion to the first recited shaft (flow meter) and the recording device is servoed in a discontinuous fashion to the second recited shaft (level gage), by choosing the servoing controls in such a manner that the recording is directly usable, the successive plotted points of the tracing corresponding for example to inches and the lengths of unwound tape representing cubic feet at a certain scale.

In a preferred embodiment of this invention, the continuous servoing, for example of the flow meter, to the tape unwinding, is obtained by means of selsyns, and the discontinuous servoing, for example of the level gage to the recording member, is realized by means of a rotating pulse generator which is driven by the motor servoing the potentiometer, the pulses picked-up at the reception being first of all rectified, for example by causing them to operate a flip-flop, and then added so as to charge a condenser which discharges into the recording device each time a fixed number of pulses has been picked-up.

In order that the objects of this invention be better understood, there will be now described in an illustrative and by no means limitative manner an embodiment of the device designed to carry out the process described and shown in the annexed drawings, in which.

Figure 1:
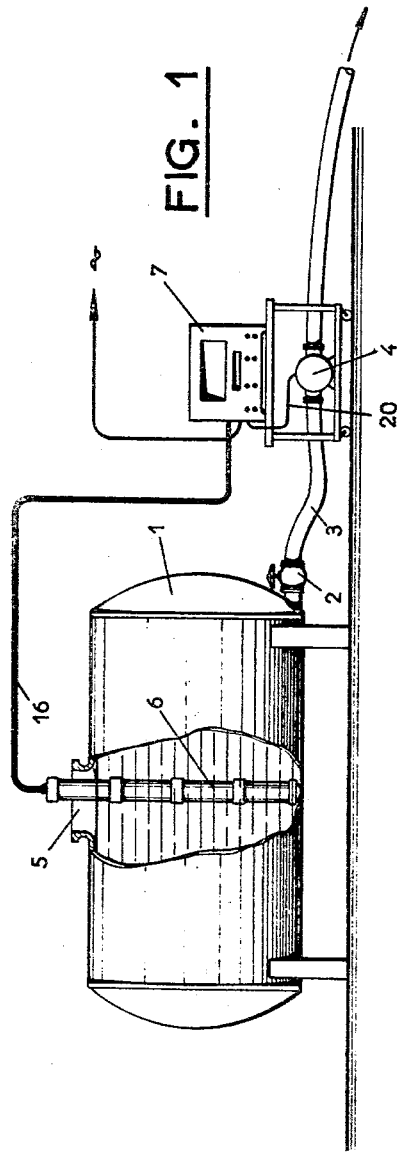
FIGURE 1 shows schematically the organization of the various elements.

There is particularly shown in FIG. 1, a container 1 for which the establishment of the gaging chart is desired. A drain valve 2 of said container 1 is connected by a hose 3 to a flow meter 4, and a level gage 6 is introduced into container 1 through the upper orifice 5 thereof. Finally, a recording device 7 is electrically connected to flow meter 4, to gage 6 and to the mains.

Figure 2:
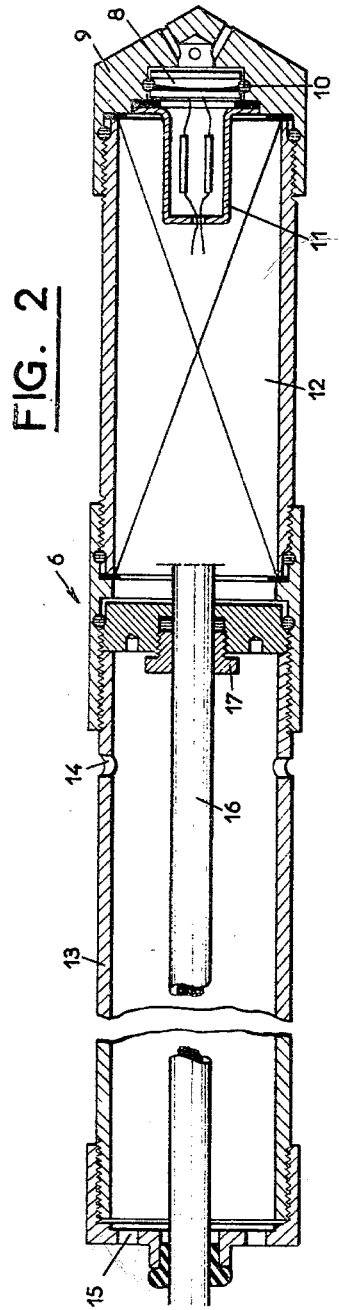
FIGURE 2 is a longitudinal section of the level gage.

As shown in FIG. 2, level gage 6 comprises at its base a device 8, adapted to measure the pressure and constituted by a deformable member on which are applied stress gages, said device being fixed in a sealing relationship in the head 9 of the level gage 6 by means of a toroidal gasket. 10. Said device is topped with a casing 11 containing the reference electrical resistors, and the whole is extended by a fluid-tight box 12 in which is disposed the electronic equipment. Said tight box 12 is extended by a non fluid-tight part 13, which is constituted by successive sections provided with openings 14 at the base thereof and 15 at the top thereof, through which the liquid may flow in and out. An electrical cable 16, which connects the electronic equipment in box 12 to recording device 7, is connected in a tight-fashion to box 12 by means of a gland 17 and extends along the axis of part 13 before leading to recording device 7.

Figure 3:
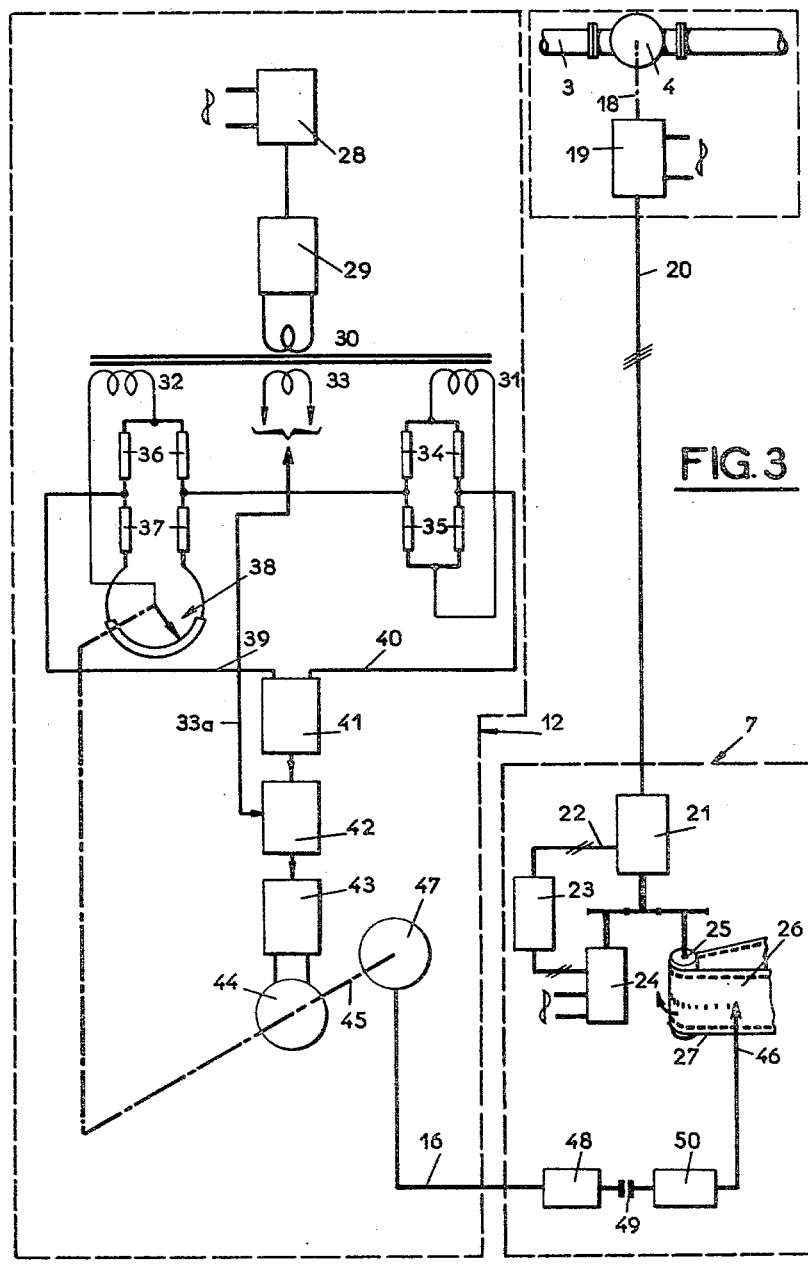
FIGURE 3 shows the overall arrangement of the device according to this invention.

There is shown again in FIG. 3 the flow meter 4 through which the liquid passes from container 1 through hose 3. Said flow meter is of a conventional type as accurate as possible and is provided with a rotating shaft 18 which drives a selsyn 19, the rotor of which is supplied by the mains and the three-phase stator of which is connected by a three-conductor cable 20 to the stator of a corresponding selsyn 21 which is located in the recording device 7. The current induced in the rotor of said selsyn 21 is picked-up by a twin-conductor cable 22, amplified by an amplifier 23 used to supply the first winding of a two-phase motor 24, the other winding of which is energized by the mains. Said motor 24 drives the rotor of selsyn 21 as well as a toothed cylinder 25 which advances a recording tape 26 provided with holes or perforations 27. The driving torque of motor 24 is proportional to the phase difference between the current picked-up in cable 22 and that of the mains, i.e. the angular displacement between the rotors of selsyns 19 and 21, and said torque tends to take-up such phase difference. If a sufficient amplifying coefficient of amplifier 23 is applied said two rotors will have substantially identical movements.

The level gage proper comprises an oscillator 28 of which the carrier current, amplified by an amplifier 29, supplies a transformer 30 provided with three secondary windings 31, 32 and 33. Secondary winding 31 energizes two diagonal junctions of a Wheatstone bridge constituted by the two resistors of the stress gage contained in the aforementioned pressure responsive device and by the two reference resistors 35. Secondary winding 32 energizes also two first diagonal junctions of a comparing Wheatstone bridge constituted by four fixed resistors 36 and 37, such bridge being adapted to be adjusted by means of a potentiometer 38, as shown in FIG. 3. The two second diagonal junctions of both bridges are connected in a series relationship with their voltages opposing each other and create, between two conductors 39 and 40, a resulting voltage which is amplified by an amplifier 41 and introduced into a phase demodulator 42 which receives from a conductor 33a the reference signal supplied by the third secondary winding 33. Said demodulator 42 delivers a rectified voltage either positive or negative, according to the direction of the unbalance between the first and the second bridges. Said rectified voltage is amplified by a D.C. amplifier 43, which energizes a D.C. motor 44, which in turn drives through a reducing gear (not shown) the potentiometer 38 in the suitable direction for obtaining balance.

Any change in the pressure applied to device 8, or, which is the same, in the height of the liquid overlying said device, results in an unbalance in the first bridge, which, as described above, results in a rotation of motor 44 driving in turn potentiometer 38 until the unbalance of the second bridge is such that the voltage on its second diagonal be equal to and opposes that on the second diagonal of the first bridge, i.e. until cancelling of the error signal from conductors 39 and 40 is obtained. Correspondence between the height of the liquid level above device 8 and rotation of the shaft 45 of motor 44 is a linear one, each revolution of said shaft corresponding to an individual difference between the dimension figures.

Servoing between rotation of shaft 45 for the level amplifier and the recording pen 46 acting on tape 26 is realized in a discontinuous manner and, preferably, by way of analogy. To realize this, there is disposed in box 12, which already contains the whole of the above described level gage, a rotating generator 47 driven by shaft 45, said generator creating a great number of pulses for the complete run of potentiometer 38.

Said pulses may have any shape and voltage whatever and may be deformed during their travel on conductor 16 which connects the level gage to recording device 7 and comprises a number of more or less perfect connecting contacts. This is of no importance, since said pulses are taken-up again by a flip-flop 48 which, for each pulse received from conductor 16, delivers a rectified pulse having a well determined shape and amplitude. Such rectified pulses charge a condenser 49 which, after receiving a sufficient number of pulses, is charged up to such a potential that it is capable to trigger a second flip-flop 50 which discharges condenser 49 and causes tape 26 to be marked by recording pen member 46. The number of pulses delivered by the pulse generator 47 for the whole operating run of potentiometer 38 determines the accuracy of the transmission, whatever initial positions of the rotating elements, and the number of pulses stored in flip-flop 50 is determined so that each marking on the tape corresponds to a difference in the dimension figure of the liquid level of one inch (or for instance of four inches), or of any other desired value.

In using the above described device, container 1 is first completely filled with water up to the level of upper orifice 5, then level gage 6 is dipped vertically in the liquid until the tip of its head 9 is seated on the container bottom. Said gage will remain stationary during all the remaining operations.

The unbalance of the measuring bridge, resulting from the rise in pressure applied to device 8, initiates rotation of motor 44 until the rotation of potentiometer 38 in the comparing bridge cancels the error signal. A device (not shown) is effective to prevent marking of the tape during such fast rotation, and a signal lamp warns the operator when balance is obtained.

With flow meter 4 connected by hose 3 to valve 2, all that is necessary for the operator to do is to open said valve, which permits the liquid to flow freely through meter 4. The rotation of the latter causes a continuous unwinding of tape 26 which is proportional to the number of cubic feet delivered, while each change by an inch in the liquid level causes generator 47 to deliver a number of pulses which is sufficient to trigger flip-flop 50 and to cause a point to be marked on the tape.

The whole of the measuring operation requires only the time necessary for draining the container, and once this recording is completed there is obtained a recorded tape on which each point represents the successive inches in the level, while the position of each of the points as measured from the beginning of the tape represents the corresponding number of cubic feet. Carrying out of the gaging chart is thus immediate, without having to make any computation or interpolation, and this may be even contemplated as being effected by a mechanical printing process.

The overall capacity of the container may be measured through the total length of the recording, or it may be obtained with greater accuracy by placing a meter either on the shaft 18 of the meter or the shaft of selsyn 21, said meter being zeroed at the beginning of the operation and being read only once after completion of the operation.

In the case where it is desired to obtain a flow chart, one could in the same manner determine a continuous servoing of tape 26, no longer at shaft 18 but rather at shaft 45, and the discontinuous servoing of the recording device, no longer at shaft 45 but at shaft 18.

It is to be positively understood that the carrying out of the process and the embodiment of the device as described above and shown in the drawings are given in an illustrative and by no means limitative manner and that any desirable modifications may be brought thereto without departing from the scope and spirit of the present invention as defined in the appended claims.

In particular, the described and shown continuous and discontinuous servoing modes may be replaced by any other suitable known transmission or servoing means.

What I claim is:

1. A device for making a chart indicating the relationship between the level of the liquid in a container and the volume of said liquid, said means comprising a recording device equipped with means for continuously advancing and means for marking a strip of indicia-receiving material, means for generating a signal indicative of changes in the said liquid level, means for generating a signal indicative of changes in said liquid volume, and a pulse generator responsive to the signals of one of said signal generating means and connected to actuate said marking means at intervals indicative of changes of a predetermined magnitude, said strip advancing means being responsive to the signals of the other signal generating means.

2. A device as claimed in claim 1 in which the strip advancing means is responsive to the signals of the signal generating means which generates signals indicative of changes in the volume of said liquid, and the pulse generator is responsive to the signals of the signal generating means which generates signals indicative of changes in the liquid level.

3. A device as claimed in claim 2 in which the means which generates signals indicative of changes in the volume of the liquid comprises a continuously rotating flow-meter and drives said strip advancing means through a selsyn motor.

4. A device as claimed in claim 2 in which the means which generates signals indicative of changes in the fluid level is of the strain-gauge type and comprises a Wheatstone bridge and a motor for balancing the bridge, said motor being connected to said pulse generator, and means connecting said pulse generator to said marking means for storing the energy derived from a plurality of pulses and delivering to said marking means a single pulse corresponding to a predetermined number of pulses received from said pulse generator.

References Cited by the Examiner
UNITED STATES PATENTS

| 1,898,734 | 2/33 | Linton | 73—312 |
| 2,135,061 | 11/38 | Wagner et al. | 73—3 |
| 2,628,493 | 2/53 | Sandefin | 73—1 |
| 2,651,939 | 9/53 | Weaver | 73—301 |
| 2,766,981 | 10/56 | Lauler et al. | 73—88.5 X |
| 2,846,646 | 8/58 | Van Santen | 73—88.5 X |
| 2,883,617 | 4/59 | Lathrop | 73—88.5 X |

RICHARD C. QUEISSER, *Primary Examiner.*

ROBERT L. EVANS, JOSEPH P. STRIZAK, *Examiners.*